(12) United States Patent
Praszczalek et al.

(10) Patent No.: US 12,282,919 B2
(45) Date of Patent: Apr. 22, 2025

(54) BIOMETRIC TOKENIZED NETWORKS

(71) Applicant: MASTERCARD INTERNATIONAL INCORPORATED, Purchase, NY (US)

(72) Inventors: Przemek Praszczalek, Irvington, NY (US); Raman Narayanswamy, Nashua, NH (US)

(73) Assignee: MASTERCARD INTERNATIONAL INCORPORATED, Purchase, NY (US)

( * ) Notice: Subject to any disclaimer, the term of this patent is extended or adjusted under 35 U.S.C. 154(b) by 67 days.

(21) Appl. No.: 17/388,691

(22) Filed: Jul. 29, 2021

(65) Prior Publication Data
US 2022/0036356 A1   Feb. 3, 2022

Related U.S. Application Data

(60) Provisional application No. 63/059,696, filed on Jul. 31, 2020.

(51) Int. Cl.
*G06Q 40/00*   (2023.01)
*G06F 21/45*   (2013.01)
(Continued)

(52) U.S. Cl.
CPC .......... *G06Q 20/401* (2013.01); *G06F 21/45* (2013.01); *G06Q 20/382* (2013.01); *H04L 63/0861* (2013.01)

(58) Field of Classification Search
CPC .. G06Q 20/401; G06Q 20/382; G06Q 20/206; G06Q 20/3223; G06Q 20/363;
(Continued)

(56) References Cited

U.S. PATENT DOCUMENTS 10,491,389 B2   11/2019   Girish et al.
11,270,309 B1 *   3/2022   Ellis ................. G06Q 20/40145
(Continued)

FOREIGN PATENT DOCUMENTS

WO      0205077 A2    1/2002
WO   WO-2015021420 A1 *  2/2015  .......... G06Q 20/322
WO      2017151815 A1   9/2017

OTHER PUBLICATIONS

Lui et al: "State of the Art: Secure Mobile Payment" IEEE Access, vol. 8, pp. 13898-13914, 2020 (Year: 2020).*
(Continued)

*Primary Examiner* — Edward J Baird
(74) *Attorney, Agent, or Firm* — Michael Best & Friedrich LLP

(57) ABSTRACT

Biometric tokenized networks. In one embodiment, a system includes a network and a server. The server includes a memory storing a biometric token vault, a communication interface, and an electronic processor. The electronic processor is configured to: receive a biometric token (i.e., identity token), a merchant identifier, and transaction details via the network, confirm a uniqueness of the biometric token with a second biometric token stored in the biometric token vault, generate a relationship identifier based on the merchant identifier and a global unique identifier linked to the second biometric token, and determine whether the relationship identifier is associated with a payment account reference, and output the merchant identifier, the transaction details, and a personal account number associated with the payment account reference to an issuer via the network in response to determining that the relationship identifier is associated with the payment account reference.

20 Claims, 10 Drawing Sheets

(51) Int. Cl.
*G06Q 20/38* (2012.01)
*G06Q 20/40* (2012.01)
*H04L 9/40* (2022.01)

(58) Field of Classification Search
CPC ... G06Q 20/40145; G06F 21/45; G06F 21/32; H04L 63/0861; H04W 12/06
See application file for complete search history.

(56) References Cited

U.S. PATENT DOCUMENTS

| | | | |
|---|---|---|---|
| 2006/0059111 A1* | 3/2006 | Tucker | G06F 21/6263 |
| | | | 705/75 |
| 2008/0114697 A1 | 5/2008 | Black et al. | |
| 2011/0208659 A1* | 8/2011 | Easterly | G06Q 20/3274 |
| | | | 705/79 |
| 2012/0330765 A1 | 12/2012 | Fried et al. | |
| 2013/0110658 A1* | 5/2013 | Lyman | G06Q 20/20 |
| | | | 705/41 |
| 2015/0019944 A1* | 1/2015 | Kalgi | G06Q 20/3552 |
| | | | 715/205 |
| 2015/0026049 A1* | 1/2015 | Theurer | G06Q 20/36 |
| | | | 705/41 |
| 2015/0319158 A1* | 11/2015 | Kumnick | H04L 63/083 |
| | | | 726/9 |
| 2016/0239887 A1* | 8/2016 | Zhao | G06Q 30/0607 |
| 2016/0301683 A1* | 10/2016 | Laxminarayanan | |
| | | | G06Q 20/027 |
| 2017/0255922 A1* | 9/2017 | Jin | G06Q 20/325 |
| 2019/0295054 A1* | 9/2019 | Purves | G06Q 20/12 |
| 2020/0067917 A1 | 2/2020 | VicBain et al. | |
| 2020/0118115 A1* | 4/2020 | Zarakas | G06Q 20/204 |

OTHER PUBLICATIONS

International Search Report and Written Opinion for Application No. PCT/US2021/043636 dated Oct. 25, 2021 (12 pages).

* cited by examiner

BIOMETRIC TOKENIZED NETWORKS

CROSS-REFERENCE TO RELATED APPLICATION

This application claims the benefit of U.S. Provisional Application No. 63/059,696, filed on Jul. 31, 2020, the entire content of which is hereby incorporated by reference.

FIELD OF THE INVENTION

The present disclosure relates generally to tokenized networks. More specifically, the present disclosure relates to combining remuneration capabilities, included but not limited to tokenized remittance, with biometrically-initiated interactions.

SUMMARY

The biometric tokenized networks of the present disclosure provide several distinct improvements and advantages over other networks. First and foremost, the biometric tokenized networks establish secure and privacy-enhancing storage of identity tokens on edge devices (i.e., mobile devices), so that biometrically-enabled transactions may be processed in an offline environment when biometric tokens are stored locally on the edge devices. Further, the improved security and data privacy posture enables design, development, and implementation of more flexible software solutions where biometric data may be processed and/or stored in various configurations (e.g., physical location, on mobile device versus cloud, with individual or with digital identity service provider, offline ("cold") storage versus online ("hot") storage of biometrically-derived data, etc.) with respect to system architecture.

Second, the biometric tokenized networks establish remunerations using multiple biometric modalities while having a minimal impact on the size of the database and the size of the message necessary to convey the biometric authentication, remuneration transactions, and/or the related digital identity transactions because the identity tokens may be ten to twenty-five times smaller than conventional biometric templates. In other words, the biometric tokenized networks are more efficient than conventional networks due to the identity tokens being smaller than the conventional biometric templates.

Third, the biometric tokenized networks establish the inclusion of identity tokens into signed verifiable credentials (VC) for the purpose of conveying a trusted message associated with a specific registered individual and linked to a specific remuneration account, and facilitate the biometric authentication within the tokenized network.

Additionally, the biometric tokenized networks lower security/data-privacy risks by processing and transmitting biometric tokens (i.e., identity tokens) in lieu of encrypted biometric templates in the cloud and on the mobile device (i.e., point of service).

One embodiment of the present disclosure includes a first system. The first system including a network and a server. The server including a memory storing a biometric token vault, a communication interface, and an electronic processor that is communicatively connected to the memory, the communication interface, the electronic processor configured to: receive a biometric token, a merchant identifier, and transaction details via the network, confirm a uniqueness of the biometric token with a second biometric token stored in the biometric token vault, generate a relationship identifier based on the merchant identifier and a global unique identifier linked to the second biometric token, and determine whether the relationship identifier is associated with a remuneration account reference, and output the merchant identifier, the transaction details, and a personal account number associated with the remuneration account reference to an issuer via the network in response to determining that the relationship identifier is associated with the remuneration account reference.

Another embodiment of the present disclosure includes a second system. The second system including a network, a biometric capture device, and a server. The biometric capture device including a memory storing a biometric token vault, a communication interface, a biometric capture circuitry, and an electronic processor that is communicatively connected to the memory, the communication interface, and the biometric capture circuitry, the electronic processor configured to: control the biometric capture circuitry to capture biometric information of an individual, generate a biometric token based on the biometric information, confirm a uniqueness of the biometric token with a second biometric token stored in the biometric token vault, and generate a relationship identifier based on a merchant identifier and a global unique identifier linked to the second biometric token. The server including a memory, a communication interface, and an electronic processor that is communicatively connected to the memory, the communication interface, the electronic processor configured to: receive the relationship identifier, the merchant identifier, and transaction details via the network, determine whether the relationship identifier is associated with a remuneration account reference, and output the merchant identifier, the transaction details, and a personal account number associated with the remuneration account reference to an issuer via the network in response to determining that the relationship identifier is associated with the remuneration account reference.

Yet another embodiment of the present disclosure includes a third system. The third system including a network and a biometric capture device. The biometric capture device including a memory storing a biometric token vault, a communication interface, a biometric capture circuitry, and an electronic processor that is communicatively connected to the memory, the communication interface, and the biometric capture circuitry, the electronic processor configured to: control the biometric capture circuitry to capture biometric information of an individual, generate a biometric token based on the biometric information, confirm a uniqueness of the biometric token with a second biometric token stored in the biometric token vault, generate a relationship identifier based on a merchant identifier and a global unique identifier linked to the second biometric token, retrieve a customer profile associated with the relationship identifier, and output remuneration information from the customer profile, the merchant identifier, and transaction details via the network.

DETAILED DESCRIPTION OF THE EMBODIMENTS

Before any embodiments of the present disclosure are explained in detail, it is to be understood that the present disclosure is not limited in its application to the details of construction and the arrangement of components set forth in the following description or illustrated in the following drawings. The present disclosure is capable of other embodiments and of being practiced or of being carried out in various ways.

Figure 1:
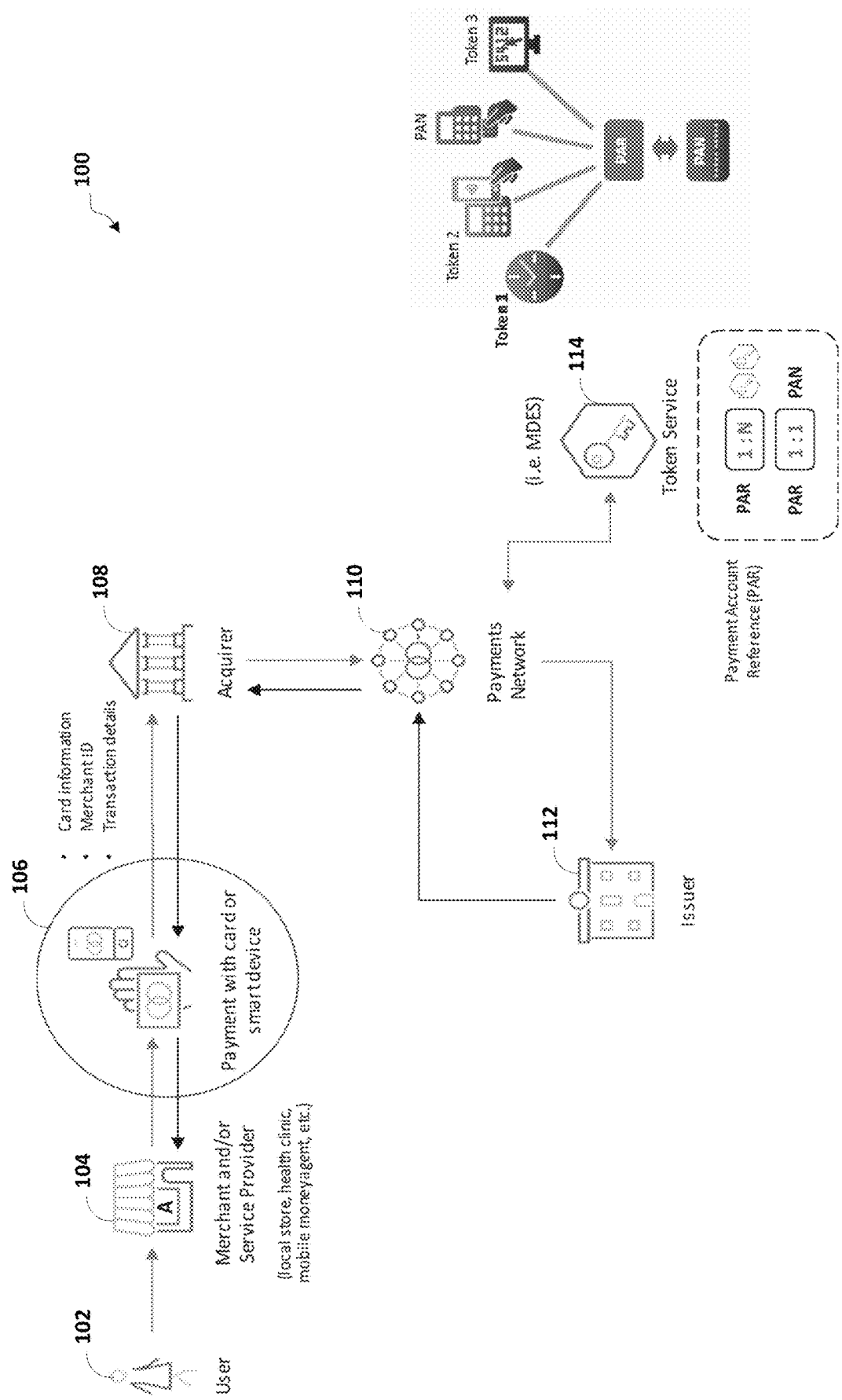
FIG. 1 illustrates a flow diagram of a comparative payment network system.

FIG. 1 illustrates a flow diagram 100 of a comparative payment network system. In the example of FIG. 1, the flow diagram 100 includes a user 102, a merchant and/or service provider 104, a payment with a card or smart device 106, an acquirer 108, a payments network 110, an issuer 112, and a token service 114.

In the flow diagram 100, the user 102 pays for a product or service from the merchant and/or service provider 104 with the payment with the card or the smart device 106. The card information of the payment with the card or the smart device 106, the merchant ID of the merchant and/or service provider 104, and the transaction details are sent to an acquirer 108. The acquirer 108 determines whether the card information is a personal account number (PAN) from a card or a token from a smart device.

Responsive to determining that the card information is the PAN, the acquirer 108 transmits the card information relating to the payment with the card or the smart device 106, the merchant ID of the merchant and/or service provider 104, and the transaction details to the issuer 112 via the payments network 110. Responsive to determining that the card information is the token, the acquirer 108 transmits the card information relating to the payment with the card or the smart device 106, the merchant ID of the merchant and/or service provider 104, and the transaction details to the token service 114 via the payments network 110. The token service 114 determines a payment account reference (PAR) that matches the token and determines the PAN associated with the PAR. The token service 114 then transmits the PAN, the merchant ID of the merchant and/or service provider 104, and the transaction details to the issuer 112 via the payments network 110.

However, the token service 114 cannot process a biometric token because the biometric token is incompatible with the token service 114. The biometric token is incompatible with the token service 114 because the PAR in the token service 114 cannot be matched to an unknown biometric token. The comparative system 100 does not process biometric data nor does it facilitate for the use of biometric tokens as a means to process payments and related transactions.

Figure 2:
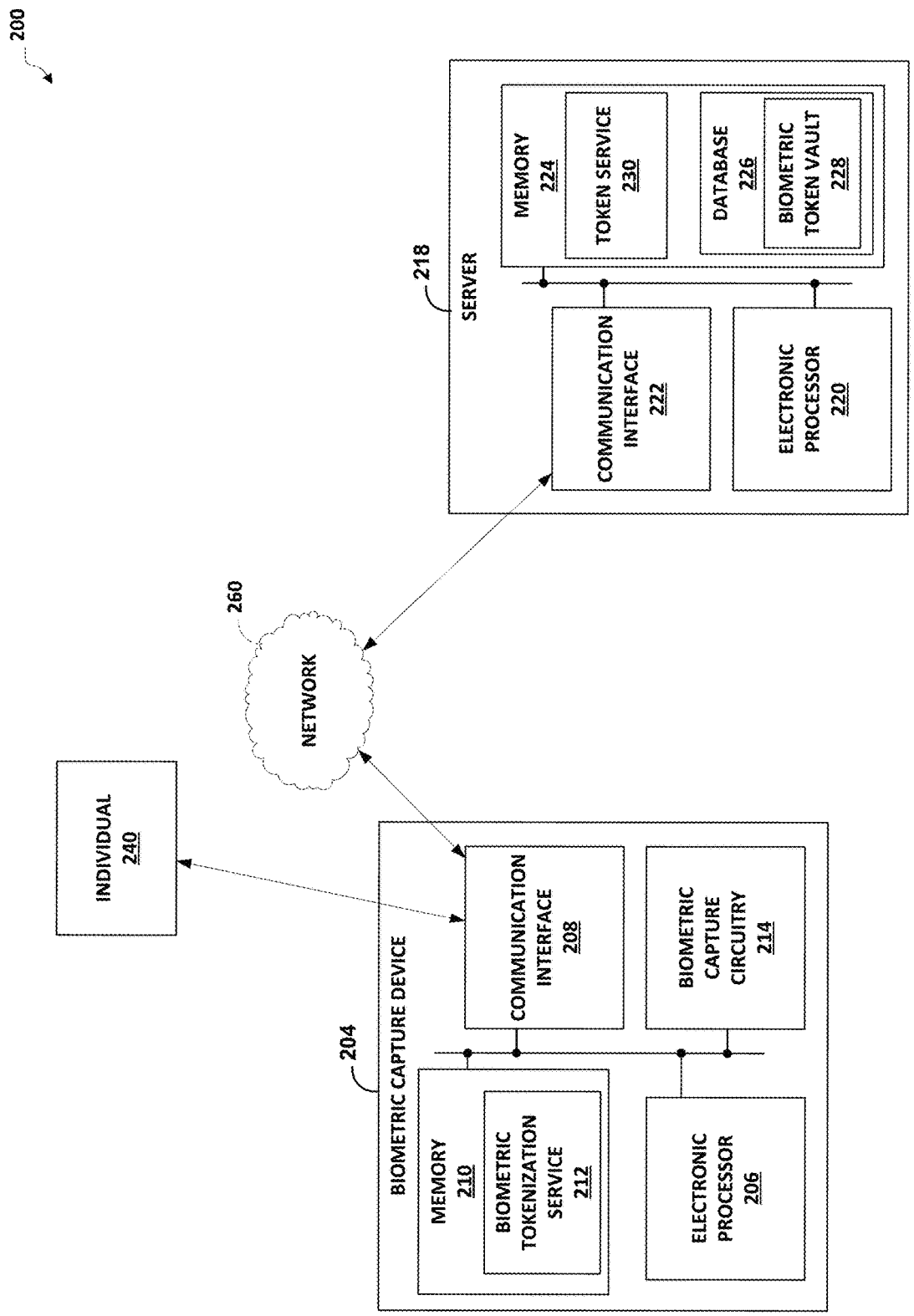
FIG. 2 illustrates a first example system for a tokenized network with biometric payments.

FIG. 2 illustrates a first example system 200 for a tokenized network with biometric payments. The biometric capture device 204 and the server 218 may be owned by, or operated by or on behalf of, an administrator. The server 218 may also be implemented by one or more networked computer servers. The biometric capture device 204 and the server 2018 could be connected via a network that does not require online connectivity.

The biometric capture device 204 includes an electronic processor 206, a communication interface 208, a memory 210, a biometric capture circuitry 214, and a display screen (not shown). The biometric capture device 204 may sometimes include a local deployment of a token vault 228. It should be understood that, in some embodiments, the biometric capture device 204 may include fewer or additional components in configurations different from that illustrated in FIG. 2. Also the biometric capture device 204 may perform additional functionality than the functionality described herein. In addition, some of the functionality of the biometric capture device 204 may be incorporated into other servers (e.g., incorporated into the server 218) and vice-versa. As illustrated in FIG. 2, the electronic processor 206, the memory 210, the communication interface 208, the biometric capture circuitry 214, and the display screen are electrically coupled by one or more control or data buses enabling communication between the components.

The electronic processor 206 is a microprocessor or another suitable processing device that executes machine-readable instructions stored in the memory 210. For example, the electronic processor 206 may execute instructions stored in the memory 210 to perform the functionality described herein.

The memory 210 may include a program storage area (for example, read only memory (ROM)) and a data storage area (for example, random access memory (RAM), and other non-transitory, machine-readable medium). The program storage area includes a biometric tokenization service 212. In some examples, the biometric tokenization service 212 may be a standalone application. In other examples, the biometric tokenization service 212 is a feature that is part of a separate application (e.g., the biometric tokenization service 212 may be included as part of a camera application, a banking application, or other suitable application). The data storage area includes a biometric token repository (not shown). Although shown within the biometric capture device 204, memory 210 may be, at least in part, implemented as network storage that is external to the biometric capture device 204 and accessed via the communication interface 208. For example, all or part of memory 210 may be housed on the "cloud." The communication interface 208 may be implemented as one or both of a wired network interface and a wireless network interface.

The biometric tokenization service 212 causes the electronic processor 206 to generate a biometric token from the biometric information captured by the biometric capture circuitry 214. For example, when the biometric capture circuitry 214 is a camera, the biometric tokenization service 212 causes the electronic processor 206 to generate a biometric token from a facial image of the individual 240 captured by the camera. The biometric token, in one example, may be generated by a unique biometric transformation mechanism, e.g., a biometric algorithm developed by TrustStamp.ai®.

The biometric token also includes a timestamp or some form of temporal information. The biometric token as described herein is a "live" biometric token that must have been generated within a certain threshold as evidenced by the timestamp or other form of temporal information that is included in the biometric token. A "live" biometric token prevents biometric tokens that are older than a predetermined amount of time, or other previously created token, or synthetically-generated tokens, etc. from being considered in the biometric remuneration system (where remuneration may be considered equivalent to "payment").

The server 218 includes an electronic processor 220, a communication interface 222, and a memory 224. The electronic processor 220 is communicatively coupled to the communication interface 222 and the memory 224. The electronic processor 220 is a microprocessor or another suitable processing device. The communication interface 222 may be implemented as one or both of a wired network interface and a wireless network interface. The memory 224 is one or more of volatile memory (e.g., RAM) and non-volatile memory (e.g., ROM, FLASH, magnetic media, optical media, et cetera). In some examples, the memory 224 is also a non-transitory computer-readable medium. The memory 224 may be, at least in part, implemented as network storage that is external to the server 218 and accessed via the communication interface 222. For example, all or part of memory 224 may be housed on the "cloud."

The biometric token vault 228 may be stored within a transitory or non-transitory portion of the memory 224. The biometric token vault 228 includes machine readable instructions that are executed by processor 220 to perform the functionality of the server 218 as described below with respect to FIG. 2. For example, in the illustrated embodiment, the database 226 may include the biometric token vault that stores the biometric token generated by the biometric capture device 204 regarding the individual 240. The Biometric token vault 228 may be based on a centralized and/or decentralized data storage system.

The biometric capture device 204 may be a web-compatible mobile computer, such as a laptop, a tablet, a smart phone, or other suitable computing device. Alternately, or in addition, the biometric capture device 204 may be a desktop computer. Additionally, in some examples, the biometric capture circuitry 214 may be an external device connected to the biometric capture device 204. The biometric capture circuitry 214 may be one or more biometric scanning devices (e.g., a device that scans fingerprints, facial features, irises, handwriting, or other biometric features) now known or subsequently developed.

Figure 3:
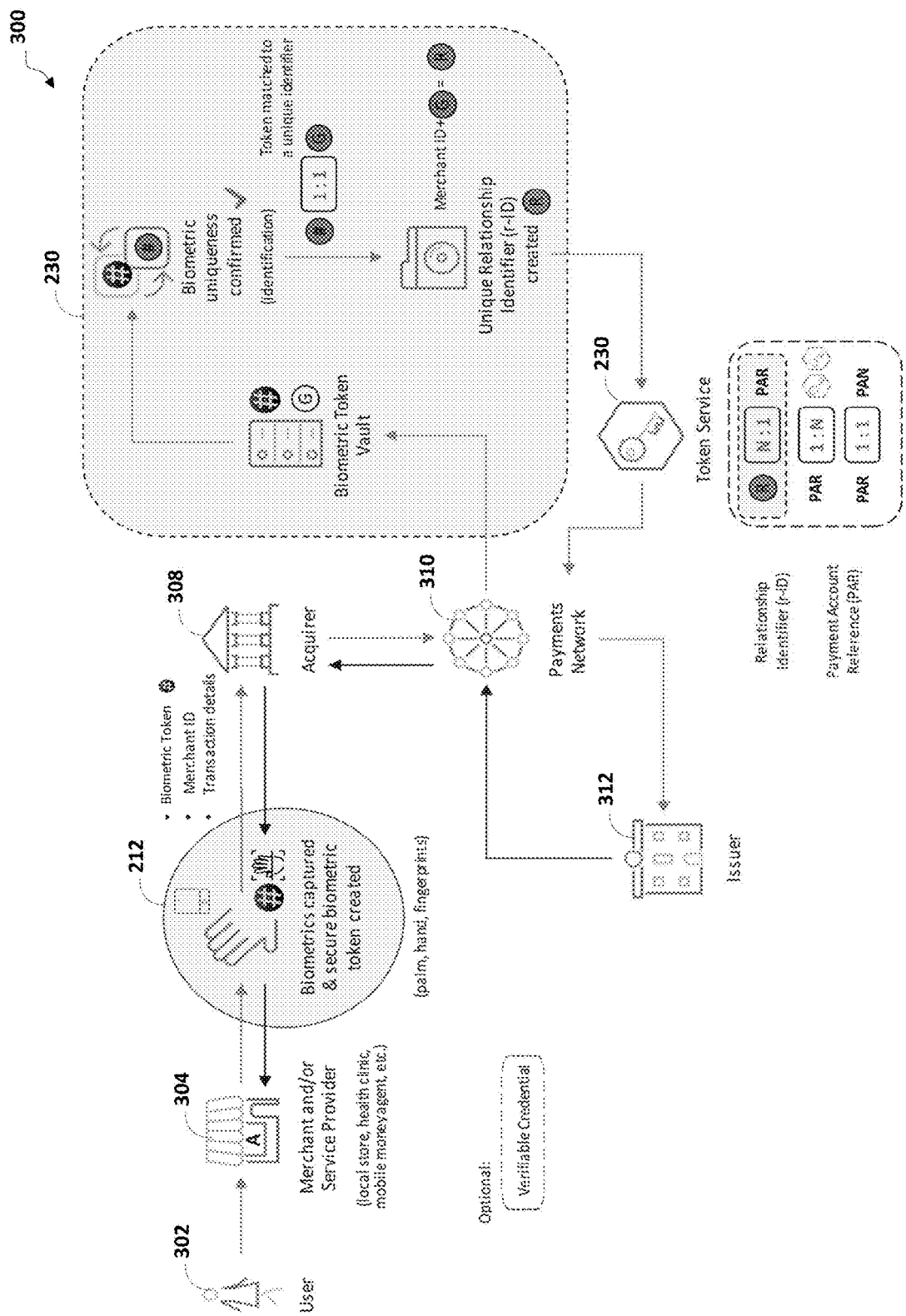
FIG. 3 illustrates an example flow diagram of the example system of FIG. 2.

FIG. 3 illustrates an example flow diagram 300 of the example system 200 of FIG. 2. In the example of FIG. 3, the flow diagram 300 includes a user 302, a merchant and/or service provider 304, a biometric tokenization service 212, an acquirer 308, a payments network 310, an issuer 312, and a token service 230. The user 302, the merchant and/or service provider 304, the acquirer 308, the payments network 310, and the issuer 312 are similar to the user 102, the merchant and/or service provider 104, the biometric token 106, the acquirer 108, the payments network 110, the issuer 112, and the token service 114 as described above in FIG. 1. Consequently, redundant description of these components of the flow diagram 300 is not repeated.

In the flow diagram 300, the payment with the card or the smart device 106 of FIG. 1 is entirely replaced with the biometric tokenization service 212. A biometric token is generated by the electronic processor 206 of the biometric capture device 204 executing the biometric tokenization service 212 as described above in FIG. 2. As illustrated in FIG. 3, a biometric token (i.e., one example of the identity token 306), the merchant ID of the merchant and/or service provider 304, and the transaction details are sent to the acquirer 308.

The acquirer 308 determines whether a biometric token is included with the merchant ID and the transaction details. Responsive to determining that the biometric token is included with the merchant ID and the transaction details, the acquirer 308 transmits the biometric token 306, the merchant ID of the merchant and/or service provider 304, and the transaction details to the token service 230 via the payments network 310.

The token service 230 determines whether the biometric token is unique and that the biometric token matches a second biometric token stored in the biometric token vault 228. Responsive to matching the biometric token to a second biometric token, the token service generates a relationship identifier based on the merchant ID and the second biometric token. In some examples, the relationship identifier, biometric token, and other transaction-relevant data may be embedded into a verifiable credential (VC).

After generating the relationship identifier, the token service 230 retrieves a payment account reference (PAR) associated with the relationship identifier that is generated. After retrieving the PAR, the token service 230 determines the PAN associated with the PAR. The token service 230 then transmits the PAN, the merchant ID of the merchant and/or service provider 304, and the transaction details to the issuer 312 via the payments network 310.

Figure 4:
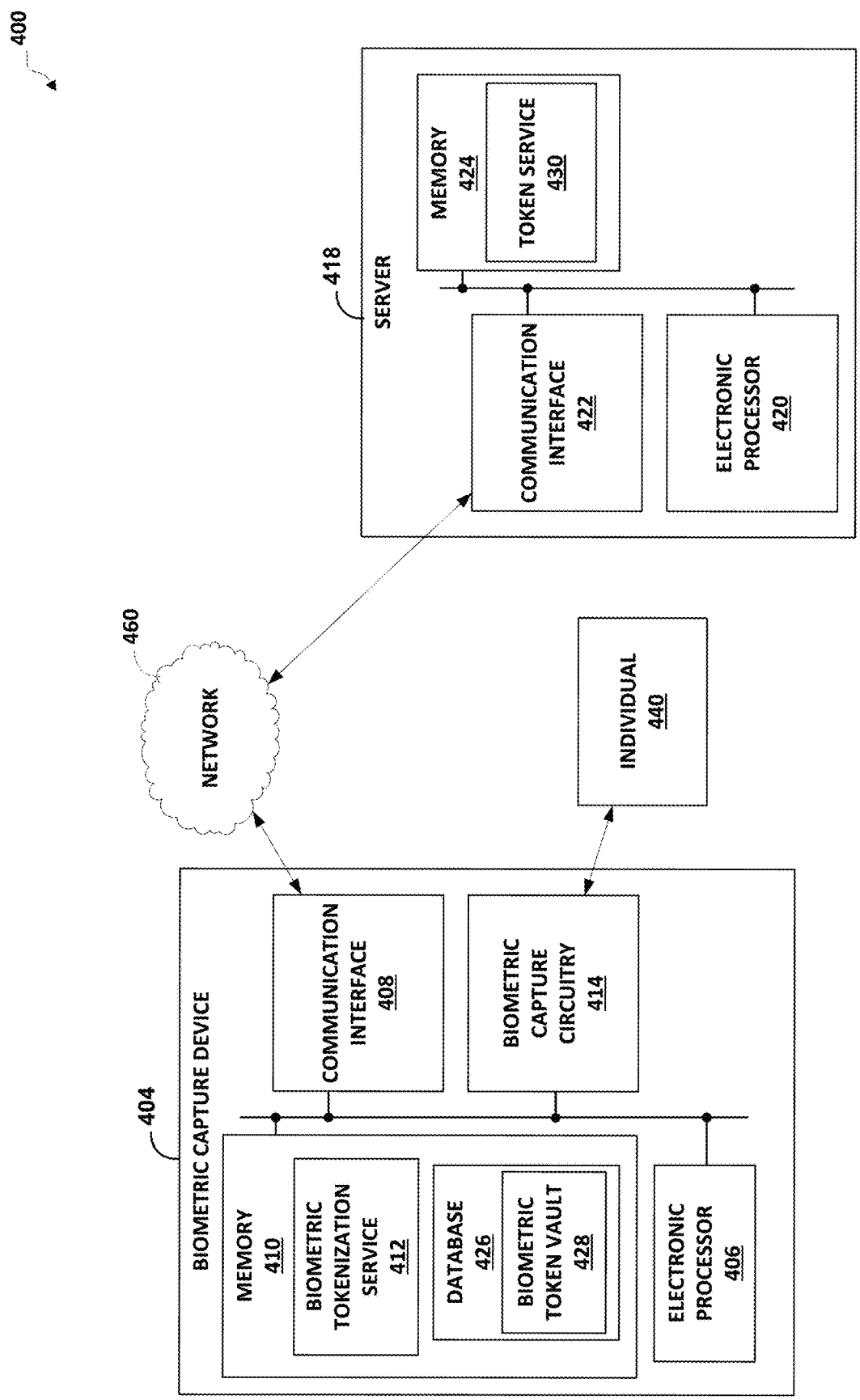
FIG. 4 illustrates a second example system for a tokenized network with biometric payments.

FIG. 4 illustrates a second example system 400 for a tokenized network with biometric payments. In the example of FIG. 4, the second example system 400 includes a biometric capture device 404, a server 418, a network 460, and an individual 440. The biometric capture device 404 and the server 418 are similar to the biometric capture device 202 and the server 218 as described above in FIG. 2. Consequently, redundant description of the biometric capture device 404 and the server 418 will not be repeated.

Unlike the memory 226 of the server 218, the memory 410 of the biometric capture device 404 includes the database 426 and the biometric token vault 428. Additionally, as described in greater detail below, the biometric tokenization service 412 includes some of the functions of the token service 230 as described above in FIG. 3.

Figure 5:
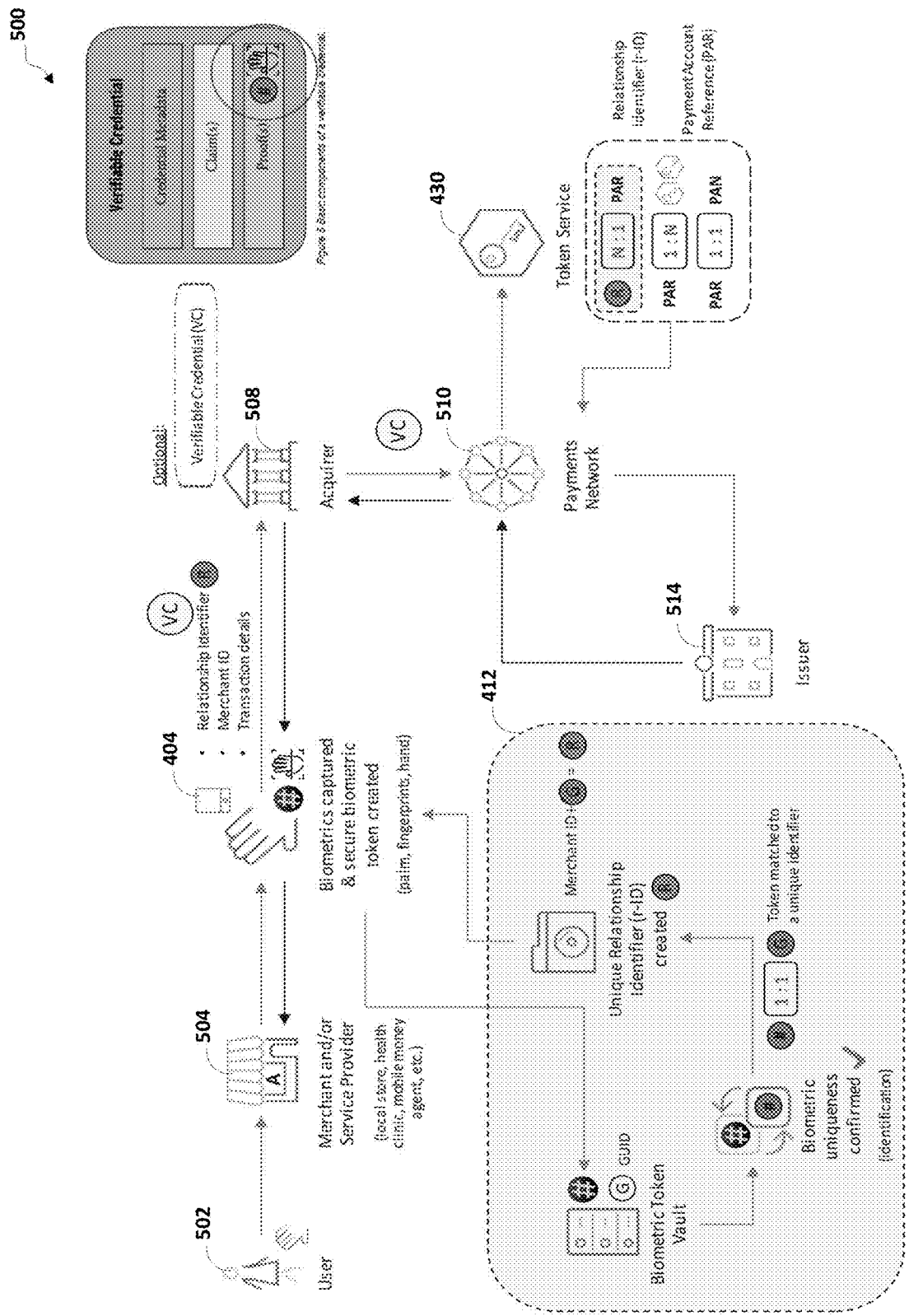
FIG. 5 illustrates an example flow diagram of the example system of FIG. 4.

FIG. 5 illustrates an example flow diagram 500 of the example system 400 of FIG. 4. In the example of FIG. 5, the flow diagram 500 includes a user 502, a merchant and/or service provider 504, a biometric tokenization service 412, an acquirer 508, a payments network 510, an issuer 512, and a token service 430. The user 502, the merchant and/or service provider 504, the acquirer 508, the payments network 510, and the issuer 512 are similar to the user 102, the merchant and/or service provider 104, the biometric token 106, the acquirer 108, the payments network 110, the issuer 112, and the token service 114 as described above in FIG. 1. Consequently, redundant description of these components of the flow diagram 500 is not repeated.

In the flow diagram 500, the payment with the card or the smart device 106 of FIG. 1 is entirely replaced with the biometric tokenization service 412. A biometric token is generated by the electronic processor 406 of the biometric capture device 404 executing the biometric tokenization service 412 as described above in FIG. 4.

After generating the biometric token, the biometric tokenization service 412 determines whether the biometric token is unique and whether the biometric token matches a second biometric token stored in the biometric token vault 428. Responsive to matching the biometric token to the second biometric token, the biometric tokenization service 412 generates a relationship identifier based on the merchant ID and the second biometric token. After generating the relationship identifier, the biometric tokenization service 412 transmits the relationship identifier, the merchant ID of the merchant and/or service provider 504, and the transaction details to the acquirer 508.

The acquirer 508 determines whether a relationship identifier is included with the merchant ID and the transaction details. Responsive to determining that the relationship identifier is included with the merchant ID and the transaction details, the acquirer 508 transmits the relationship identifier, the merchant ID of the merchant and/or service provider 504, and the transaction details to the token service 430 via the payments network 510.

The token service 430 receives the relationship identifier and retrieves a payment account reference (PAR) associated with the relationship identifier that is received. After retrieving the PAR, the token service 430 determines the PAN associated with the PAR. The token service 430 then transmits the PAN, the merchant ID of the merchant and/or service provider 504, and the transaction details to the issuer 512 via the payments network 510.

Figure 6:
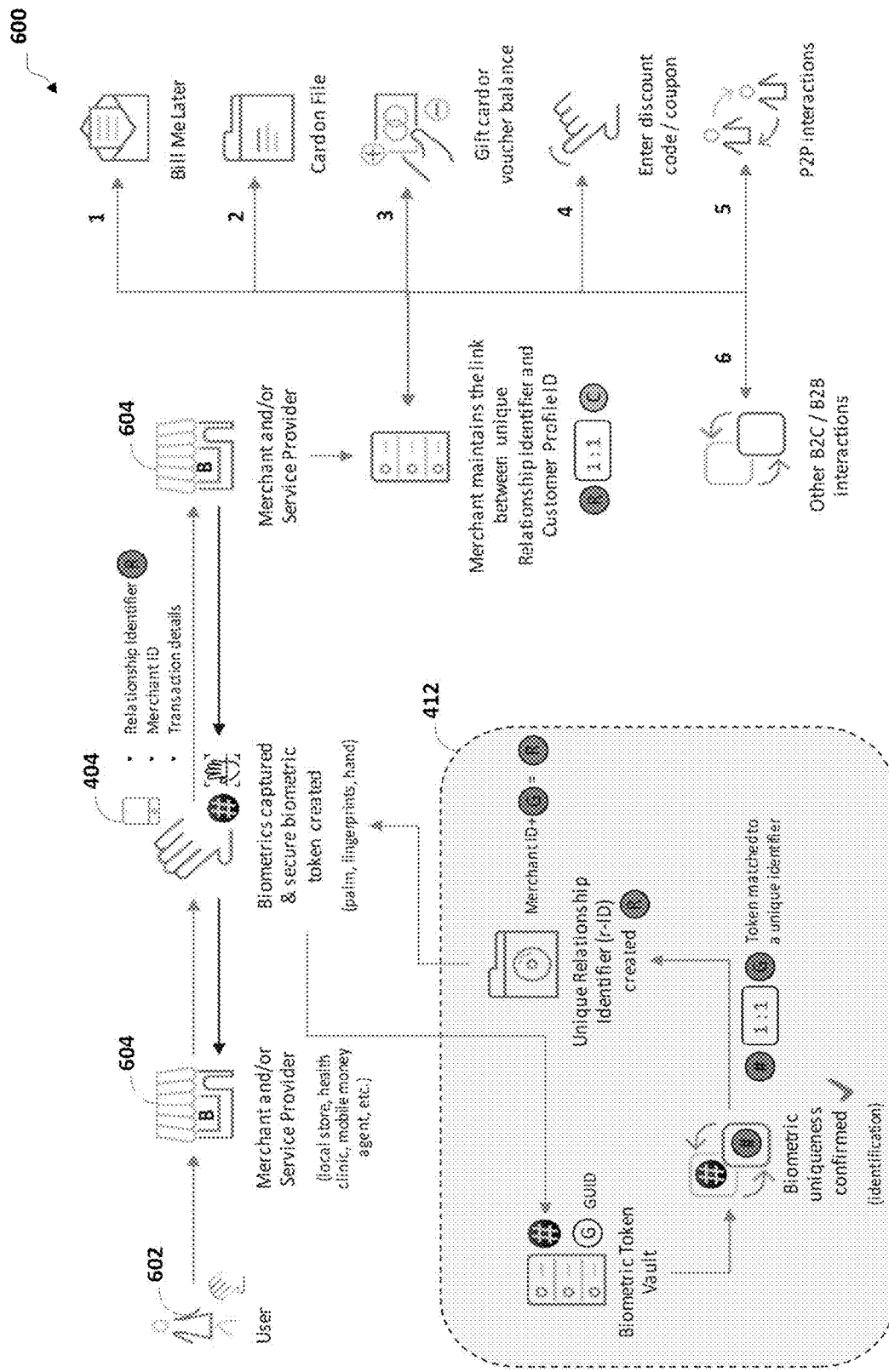
FIG. 6 illustrates a second example flow diagram of the example system of FIG. 4.

FIG. 6 illustrates a second example flow diagram 600 of the example system 400 of FIG. 4. In the example of FIG. 6, the second example flow diagram 600 includes a user 602, a merchant and/or service provider 604, and a biometric tokenization service 412. The user 602 and the merchant and/or service provider 604 are similar to the user 102 and the merchant and/or service provider 104 as described above in FIG. 1. Consequently, redundant description of these components of the second example flow diagram 600 is not repeated.

In the second example flow diagram 600, the payment with the card or the smart device 106 of FIG. 1 is initiated with the biometric tokenization service 412. A biometric token is generated by the electronic processor 406 of the biometric capture device 404 executing the biometric tokenization service 412 as described above in FIG. 4. After generating the biometric token, the biometric tokenization service 412 determines whether the biometric token is unique and whether the biometric token matches a second biometric token stored in the biometric token vault 428. Responsive to matching the biometric token to the second biometric token, the biometric tokenization service 412 generates a relationship identifier based on the merchant ID and the second biometric token. After generating the relationship identifier, the biometric tokenization service 412 transmits the relationship identifier, the merchant ID of the merchant and/or service provider 604, and the transaction details to the merchant and/or service provider 604, which maintains a link between a unique relationship identifier and a customer profile identifier. The customer profile identifier is associated with a customer profile including payment information. For example, the payment information may include deferred payment information, card on file payment information, gift card or voucher balance payment information, a discount code or coupon, an application for a new financial product/service, an option for individual to further engage with the merchant/service provider, means to access digital currency account (i.e., bitcoin, etc.), or a combination thereof.

The merchant and/or service provider 604 determines whether a relationship identifier is included with the merchant ID and the transaction details. Responsive to determining that the relationship identifier is included with the merchant ID and the transaction details, the merchant and/or service provider 604 processes the transaction using the payment information from the customer profile that is associated with the relationship identifier.

Figure 7:
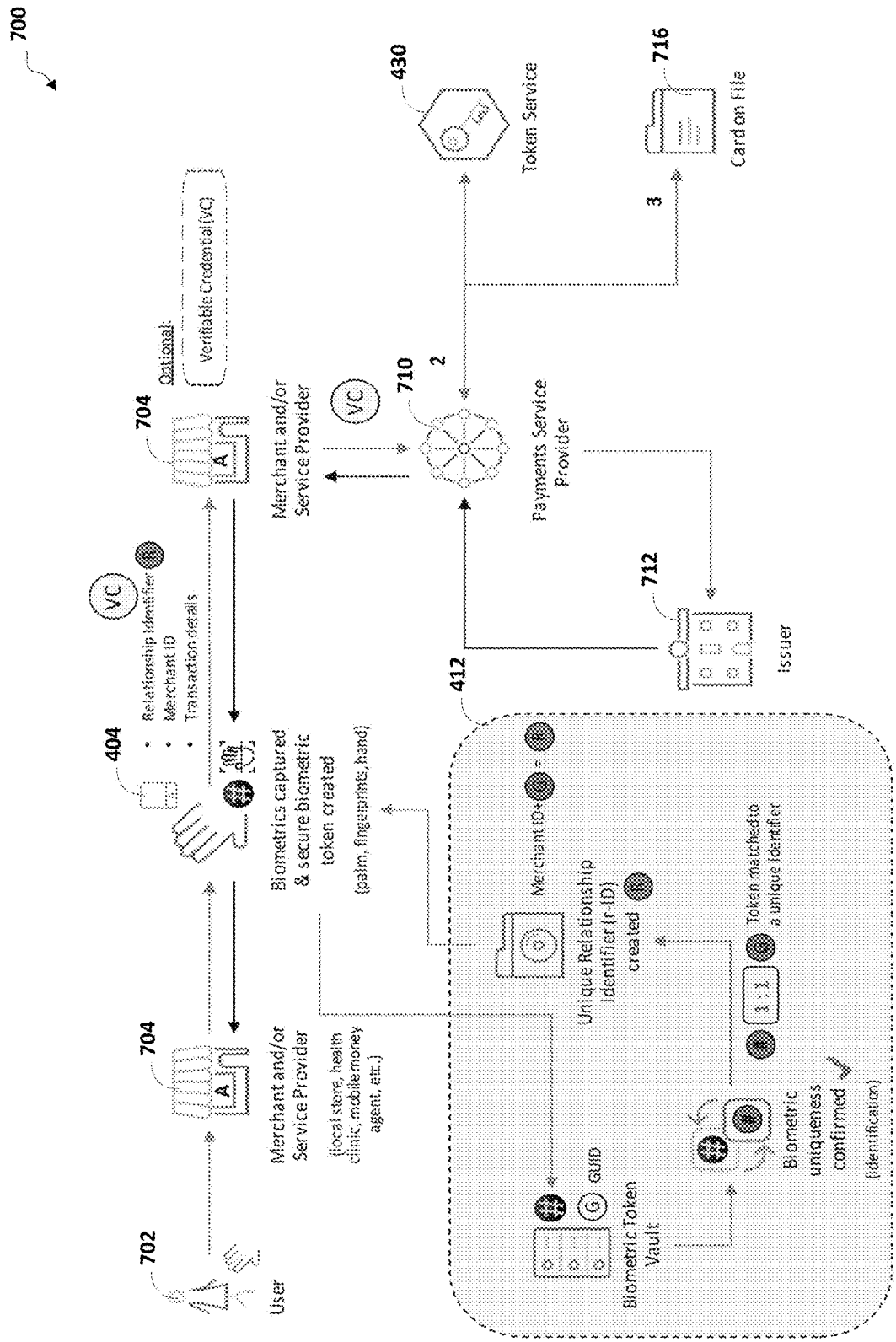
FIG. 7 illustrates a third example flow diagram of the example system of FIG. 4.

FIG. 7 illustrates a third example flow diagram 700 of the example system 400 of FIG. 4. In the example of FIG. 7, the third example flow diagram 700 includes a user 702, a merchant and/or service provider 704, a biometric tokenization service 412, a payment network 710, an issuer 712, a token service 714, and a card on file 716. The user 702, the merchant and/or service provider 704, the payment network 710, the issuer 712, and the token service 714 are similar to user 102, the merchant and/or service provider 104, the payment network 110, the issuer 112, and the token service 114 as described above in FIG. 1. Consequently, redundant description of these components of the third example flow diagram 700 is not repeated.

In the third example flow diagram 700, the payment with the card or the smart device 106 of FIG. 1 is initiated with the biometric tokenization service 412. A biometric token is generated by the electronic processor 406 of the biometric capture device 404 executing the biometric tokenization service 412 as described above in FIG. 4. After generating the biometric token, the biometric tokenization service 412 determines whether the biometric token is unique and whether the biometric token matches a second biometric token stored in the biometric token vault 428. Responsive to matching the biometric token to the second biometric token, the biometric tokenization service 412 generates a relationship identifier based on the merchant ID and the second biometric token. After generating the relationship identifier, the biometric tokenization service 412 transmits the relationship identifier, the merchant ID of the merchant and/or service provider 704, and the transaction details to the merchant and/or service provider 704.

The merchant and/or service provider 704 determines whether a relationship identifier is included with the merchant ID and the transaction details. Responsive to determining that the relationship identifier is included with the merchant ID and the transaction details, the merchant and/or service provider 704 processes the transaction using the payment information from the customer profile that is associated with the relationship identifier with the issuer 712 via the payment network 710.

In some examples, the payment information from the customer profile may be token-based payment information. In these examples, the merchant and/or service provider 704 transmits the token-based payment information to the server 418 via the payment network 710, where the token-based payment information is processed with the token service 430.

In other examples, the payment information from the customer profile may be an existing personal account number (PAN). In these examples, the merchant and/or service provider 704 transmits the PAN to the issuer 712 via the payment network 710.

Figure 8:
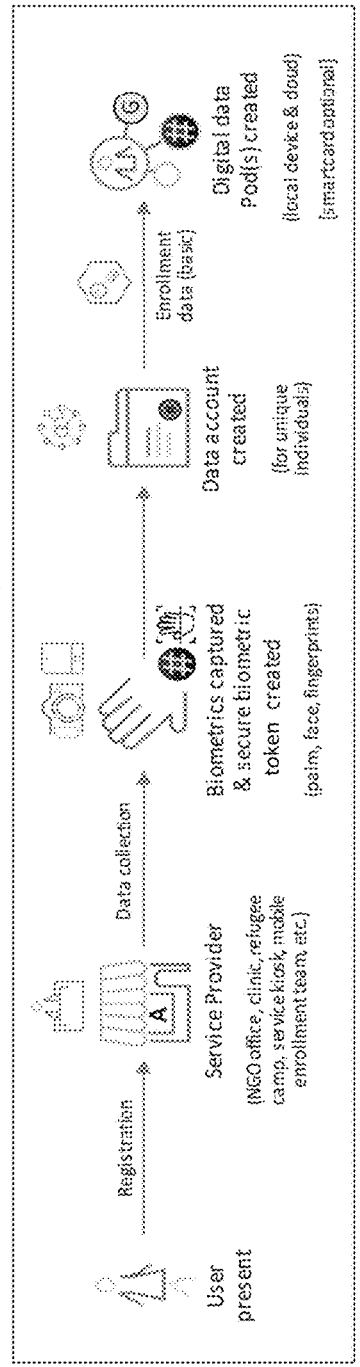
FIG. 8 illustrates an example flow diagram for either of the example systems of FIGS. 2 and 4.
Figure 8:
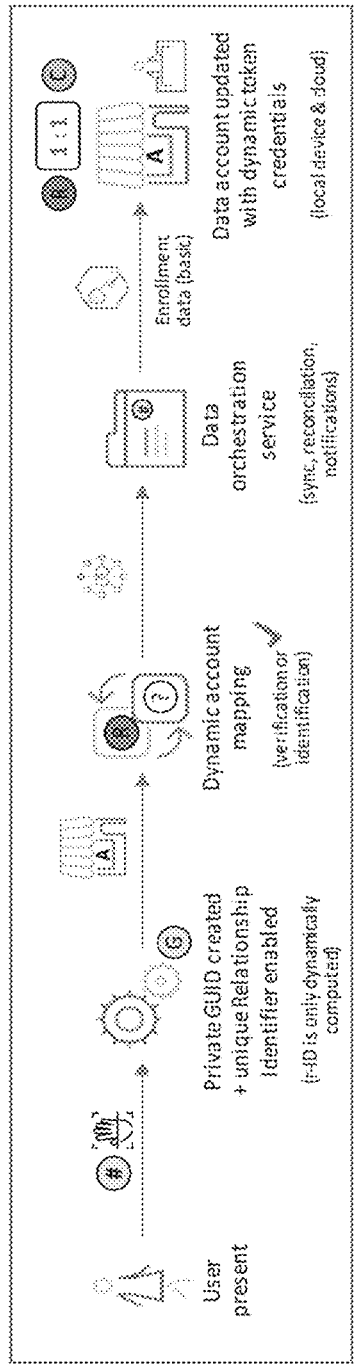

FIG. 8 illustrates an example flow diagram 800 for either of the example systems of FIGS. 2 and 4. In the example flow diagram 800, a user registers with a service provider (e.g., a financial service provider or a merchant) by providing biometric information to the service provider. The service provider creates a unique data account (e.g., a customer account) that stores a biometric token (e.g., an identity token) based on the biometric information provided by the user.

After creating the unique data account, a biometric payment network account is created and enabled for transactions by creating a private global unique identifier and a unique relationship identifier based on the private global unique identifier and the merchant ID. The unique relationship identifier is only dynamically generated from the private global unique identifier and the merchant ID. The dynamic generation of the unique relationship identifier is part of the dynamic account mapping of the unique data account, and one of the privacy & security-enhancing elements of the present disclosure. A data orchestration service orchestrates the dynamic account mapping of the unique data account with dynamic token credentials locally and in the cloud and match to the dynamic relationship identifiers.

Figure 9:
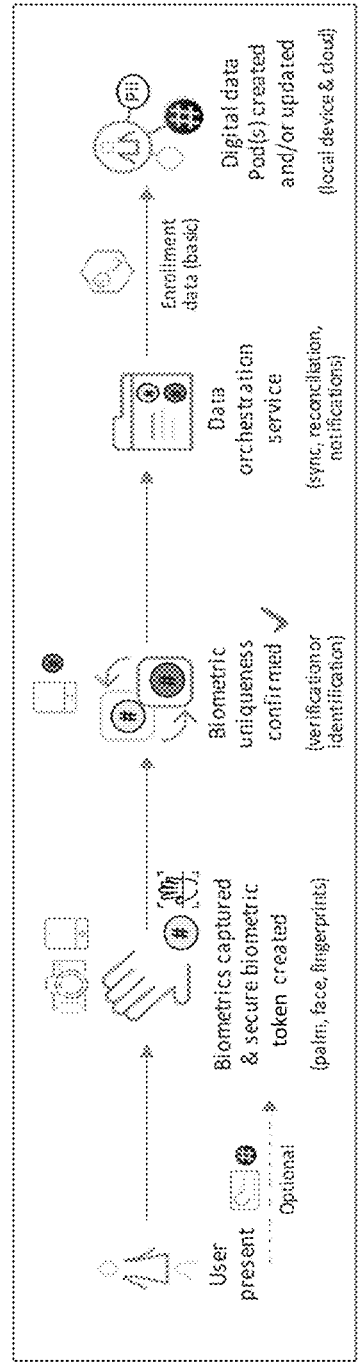
FIG. 9 illustrates a second example flow diagram for either of the example systems of FIGS. 2 and 4.
Figure 9:
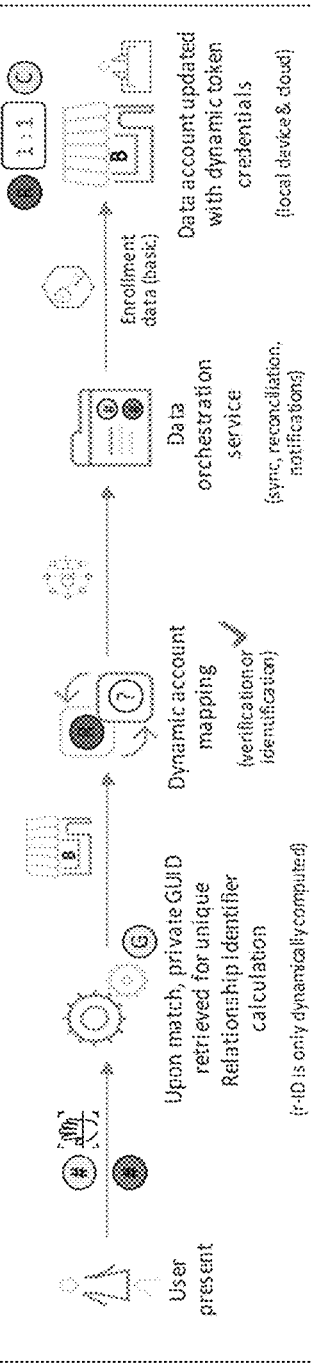

FIG. 9 illustrates a second example flow diagram 900 for either of the example systems of FIGS. 2 and 4. In the example flow diagram 900, a user provides biometric information to a second organization connected to the biometric payment network to enable biometric payments with the second organization by generating a second biometric token. The second biometric token is verified or identified by the second organization. Additionally, a data orchestration service syncs, reconciles, or notifies the unique data account regarding the enablement of biometric payments with the second organization.

The user may also provide a biometric token to an administrator of the unique data account to retrieve a private global unique identifier. The administrator may match the biometric token to the private global unique identifier and dynamically generate a relationship identifier based on the private global unique identifier and the merchant ID. A data orchestration service orchestrates the dynamic account mapping of the unique data account with dynamic token credentials locally and in the cloud and match to the dynamic relationship identifiers.

Figure 10:
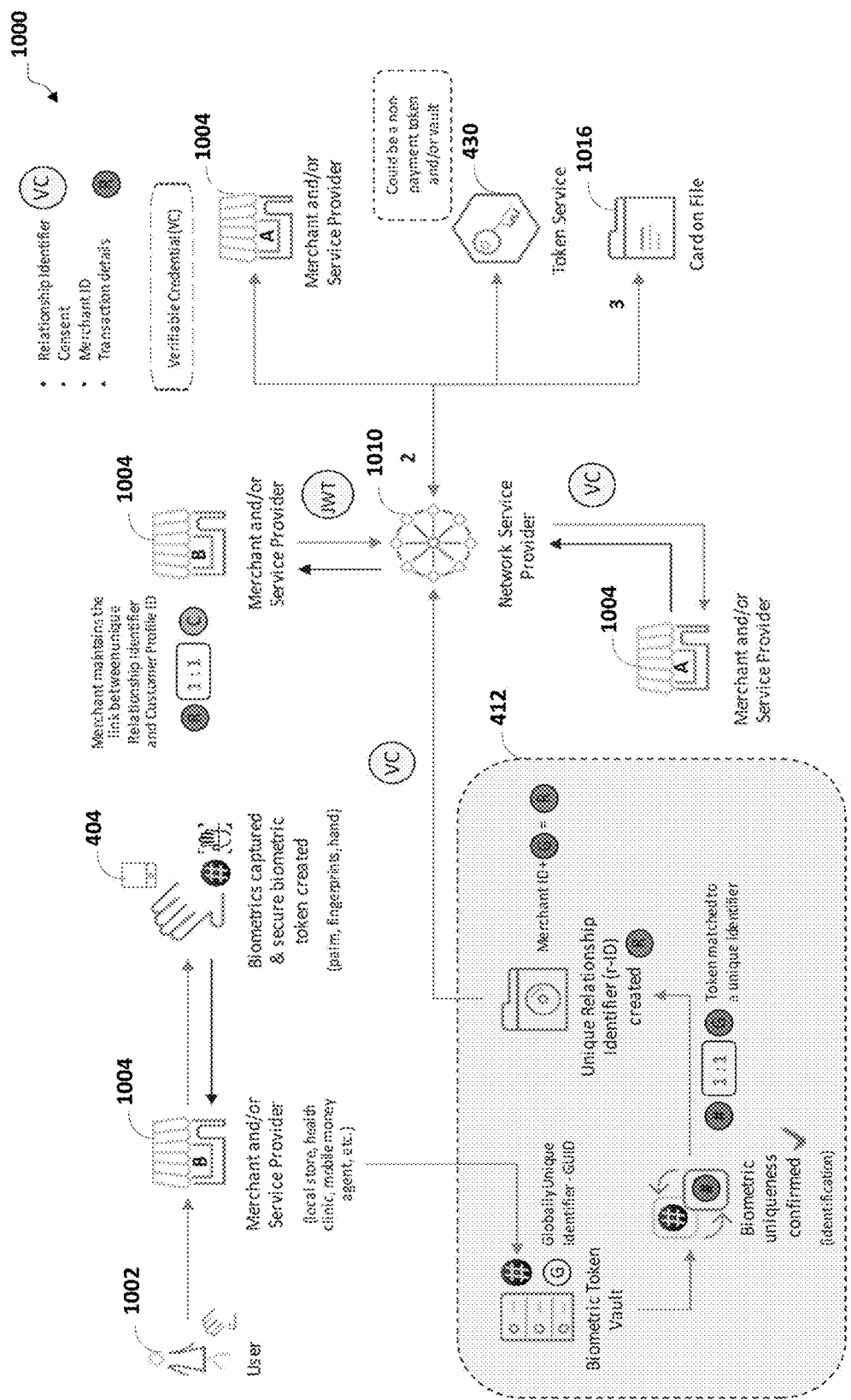
FIG. 10 illustrates a fourth example flow diagram 1000 of the example system 400 of FIG. 4.

FIG. 10 illustrates a fourth example flow diagram 1000 of the example system 400 of FIG. 4. In the example of FIG. 10, the fourth example flow diagram 1000 includes a user 1002, a merchant and/or service provider 1004, a biometric tokenization service 412, a network service provider 1010, a token service 1014, and a card on file 1016. The user 1002, the merchant and/or service provider 1004, the payment network 1010, and the token service 1014 are similar to user 102, the merchant and/or service provider 104, the payment network 110, the issuer 112, and the token service 114 as described above in FIG. 1. Consequently, redundant description of these components of the fourth example flow diagram 1000 is not repeated.

In the fourth example flow diagram 1000, the payment with the card or the smart device 106 of FIG. 1 is initiated with the biometric tokenization service 412. A biometric token is generated by the electronic processor 406 of the biometric capture device 404 executing the biometric tokenization service 412 as described above in FIG. 4. After generating the biometric token, the biometric tokenization service 412 determines whether the biometric token is unique and whether the biometric token matches a second biometric token stored in the biometric token vault 428. Responsive to matching the biometric token to the second biometric token, the biometric tokenization service 412 generates a relationship identifier based on the merchant ID and the second biometric token. After generating the relationship identifier, the biometric tokenization service 412 transmits the relationship identifier, the merchant ID of the merchant and/or service provider 1004, and the transaction details to the merchant and/or service provider 1004.

The merchant and/or service provider 1004 determines whether a relationship identifier is included with the merchant ID and the transaction details. Responsive to determining that the relationship identifier is included with the merchant ID and the transaction details, the merchant and/or service provider 1004 processes the transaction using the payment information from the customer profile that is associated with the relationship identifier with the issuer 1012 via the network service provider 1010.

In some examples, the payment information from the customer profile may be token-based payment information. In these examples, the merchant and/or service provider 1004 transmits the token-based payment information to the server 418 via the network service provider 1010, where the token-based payment information is processed with the token service 430.

In other examples, the payment information from the customer profile may be an existing personal account number (PAN). In these examples, the merchant and/or service provider 1004 transmits the PAN internally via the network service provider 1010.

Many different arrangements of the various components depicted, as well as components not shown, are possible without departing from the spirit and scope of the present disclosure. Embodiments of the present disclosure have been described with the intent to be illustrative rather than restrictive. Alternative embodiments will become apparent to those skilled in the art that do not depart from its scope. A skilled artisan may develop alternative means of implementing the aforementioned improvements without departing from the scope of the present disclosure. It should thus be noted that the matter contained in the above description or shown in the accompanying drawings is to be interpreted as illustrative and not in a limiting sense.

What is claimed is:

1. A system comprising
a network; and
a server including
a memory storing a biometric token vault, the biometric token vault including a plurality of biometric tokens and a plurality of global unique identifiers, each of the plurality of biometric tokens is linked to one of the plurality of global unique identifiers,
a communication interface, and
an electronic processor that is communicatively connected to the memory, the communication interface, the electronic processor configured to:
receive a biometric token, a merchant identifier, and transaction details via the network,
determine the biometric token matches a second biometric token from the plurality of biometric tokens stored in the biometric token vault,
generate a unique relationship identifier based on the merchant identifier-and a global unique identifier from the plurality of global unique identifiers,
wherein the global unique identifier is linked to the second biometric token,
determine the unique relationship identifier is associated with a remuneration account reference, and
output the merchant identifier, the transaction details, and a personal-account number associated with the remuneration account reference to an-issuer via the network in response to determining that the unique relationship-identifier is associated with the remuneration account reference,
wherein the global unique identifier and the unique relationship identifier are unique and associated with only one individual, and
wherein the remuneration account reference is associated with one or more non-biometric tokens from a smart device and one or more unique relationship identifiers, the one or more unique relationship identifiers including the unique relationship identifier, wherein the one or more non-biometric tokens are distinct from and are not based on any measurement or calculation related to human characteristics or human features.

2. The system of claim 1, wherein the biometric token includes a timestamp or other temporal information.

3. The system of claim 1, wherein the biometric token is based on a biometric image of an individual.

4. The system of claim 3, wherein the biometric image is an image selected from a group consisting of:
a facial image,
an iris image,
a finger image, and
a fingerprint image.

5. The system of claim 1, wherein the personal account number is a gift card account number, and wherein the issuer is a merchant identified by the merchant identifier.

6. The system of claim 1, wherein the personal account number is a debit card account number or a credit card account number.

7. The system of claim 1, wherein the global unique identifier includes some information or all of the information of the second biometric token.

8. The system of claim 1, wherein responsive to determining that the biometric token is unique, the electronic processor is further configured to:
store the biometric token that is unique in the biometric token vault,
generate a second global unique identifier that is unique from all global unique identifiers in the plurality of global unique identifiers, and
store the second global unique identifier together with the plurality of global unique identifiers to create a second plurality of global unique identifiers in the biometric token vault,
wherein the second global unique identifier is linked to the biometric token that is unique.

9. A system comprising:
a network;
a biometric capture device including
a memory storing a biometric token vault, the biometric token vault including a plurality of biometric tokens and a plurality of global unique identifiers, each of the plurality of biometric tokens is linked to one of the plurality of global unique identifiers,
a communication interface,
a biometric capture circuitry, and
an electronic processor that is communicatively connected to the memory, the communication interface, and the biometric capture circuitry, the electronic processor configured to:
control the biometric capture circuitry to capture biometric information of an individual,
generate a biometric token based on the biometric information,
determine the biometric token matches a second biometric token from the plurality of biometric tokens stored in the biometric token vault, and
generate a unique relationship identifier based on a merchant identifier and a global unique identifier from the plurality of global unique identifiers,
wherein the global unique identifier is linked to the second biometric token, and
wherein the global unique identifier and the unique relationship identifier are unique and associated with only one individual; and a server including
a memory,
a communication interface, and
an electronic processor that is communicatively connected to the memory, the communication interface, the electronic processor configured to:
receive the unique relationship identifier, the merchant identifier, and transaction details via the network,
determine the unique relationship identifier is associated with a remuneration account reference, and
output the merchant identifier, the transaction details, and a personal account number associated with the remuneration account reference to an issuer via the network in response to determining that the unique relationship identifier is associated with the remuneration account reference,
wherein the remuneration account reference is associated with one or more non-biometric tokens from a smart device and one or more unique relationship identifiers, the one or more unique relationship identifiers including the unique relationship identifier, and
wherein the one or more non-biometric tokens are distinct from and are not based on any measurement or calculation related to human characteristics or human features.

10. The system of claim 9, wherein the biometric token includes a timestamp or other temporal information.

11. The system of claim 9, wherein the biometric information is a biometric image of the individual.

12. The system of claim 11, wherein the biometric image is an image selected from a group consisting of:
a facial image of the individual,
an iris image of the individual,
a finger image of the individual, and
a fingerprint image of the individual.

13. The system of claim 9, wherein the personal account number is a gift card account number, and wherein the issuer is a merchant identified by the merchant identifier.

14. The system of claim 9, wherein the network is a payment network, and wherein the personal account number is a debit card account number or a credit card account number.

15. A system for using a biometric token to output remuneration information, the system comprising:
a network;
a biometric capture device including
a memory storing a biometric token vault, the biometric token vault including a plurality of biometric tokens and a plurality of global unique identifiers, each of the plurality of biometric tokens is linked to one of the plurality of global unique identifiers,
a communication interface,
a biometric capture circuitry, and
an electronic processor that is communicatively connected to the memory, the communication interface, and the biometric capture circuitry, the electronic processor configured to:
control the biometric capture circuitry to capture biometric information of an individual,
generate a biometric token based on the biometric information,
determine the biometric token matches a second biometric token from the plurality of biometric tokens stored in the biometric token vault,
generate a unique relationship identifier based on a merchant identifier and a global unique identifier from the plurality of global unique identifiers, wherein the global unique identifier is linked to the second biometric token,
retrieve a customer profile associated with the unique relationship identifier, and
output remuneration information from the customer profile, the merchant identifier, and transaction details via the network,
- wherein the global unique identifier and the unique relationship identifier are unique and associated with only one individual, and
- wherein the customer profile is associated with one or more non-biometric tokens from a smart device and one or more unique relationship identifiers, the one or more unique relationship identifiers including the unique relationship identifier, and
- wherein the one or more non-biometric tokens are distinct from and are not based on any measurement or calculation related to human characteristics or human features.

16. The system of claim 15, wherein the merchant identifier identifies a merchant selected from a group consisting of:
- a store,
- a health clinic, and
- a financial institution.

17. The system of claim 15, wherein the biometric token includes a timestamp or other temporal information.

18. The system of claim 15, wherein the biometric information is a biometric image of the individual.

19. The system of claim 18, wherein the biometric image is an image selected from a group consisting of:
- a facial image of the individual,
- an iris image of the individual,
- a finger image of the individual, and
- a fingerprint image of the individual.

20. The system of claim 15, wherein responsive to determining that the biometric token is unique, the electronic processor is further configured to:
- store the biometric token that is unique in the biometric token vault,
- generate a second global unique identifier that is unique from all other global unique identifiers in the plurality of global unique identifiers, and
- store the second global unique identifier together with the plurality of global unique identifiers to create a second plurality of global unique identifiers in the biometric token vault,
- wherein the second global unique identifier is linked to the biometric token that is unique.

* * * * *